Nov. 3, 1959  N. PRITIKIN  2,910,766
METHOD OF PRODUCING AN ELECTRICAL COMPONENT
Filed Feb. 24, 1953  5 Sheets-Sheet 1

INVENTOR.
Nathan Pritikin.
BY
Thiess, Olsen, Mecklenburger,
von Holst & Coltman.
ATTYS.

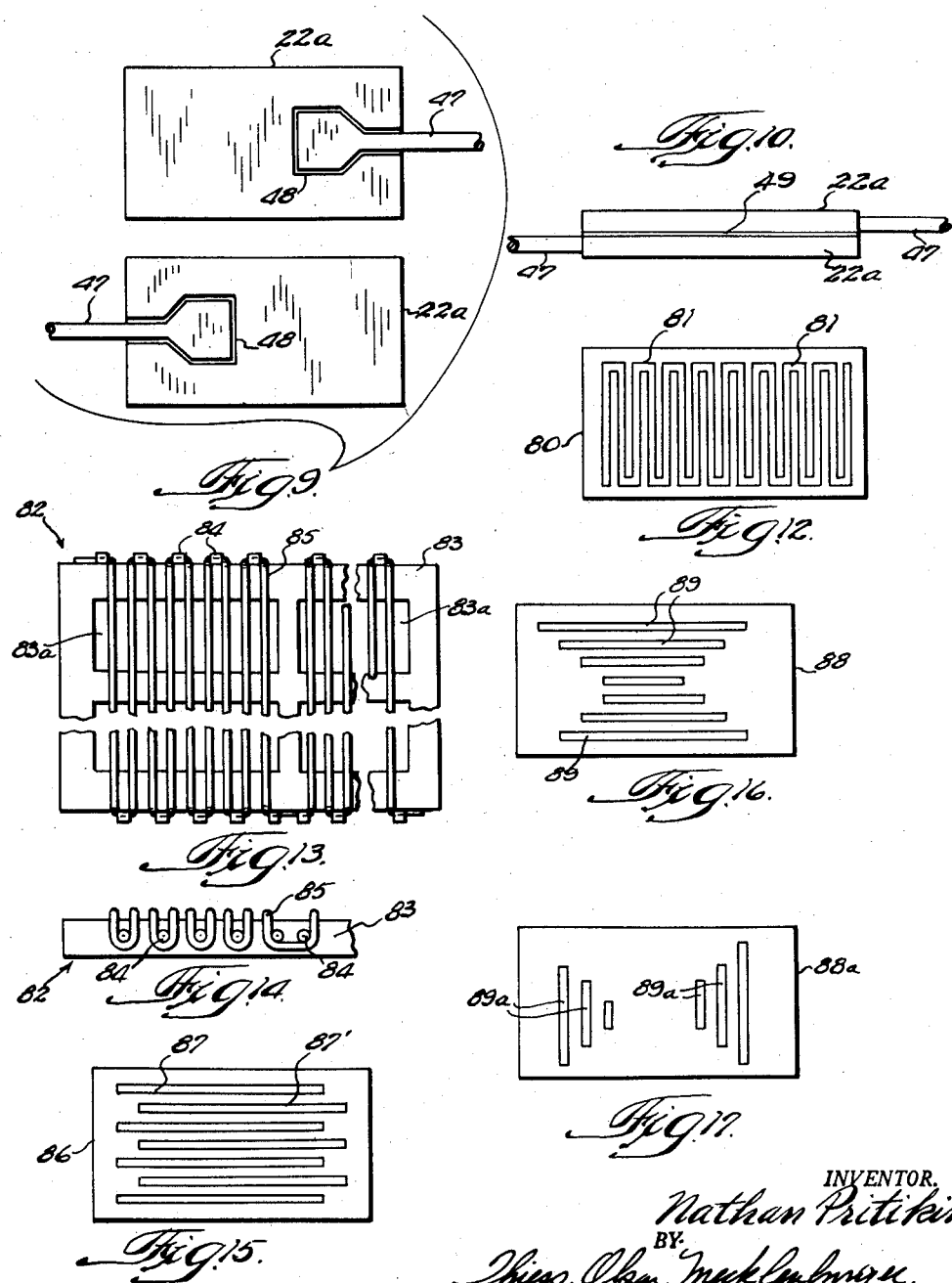

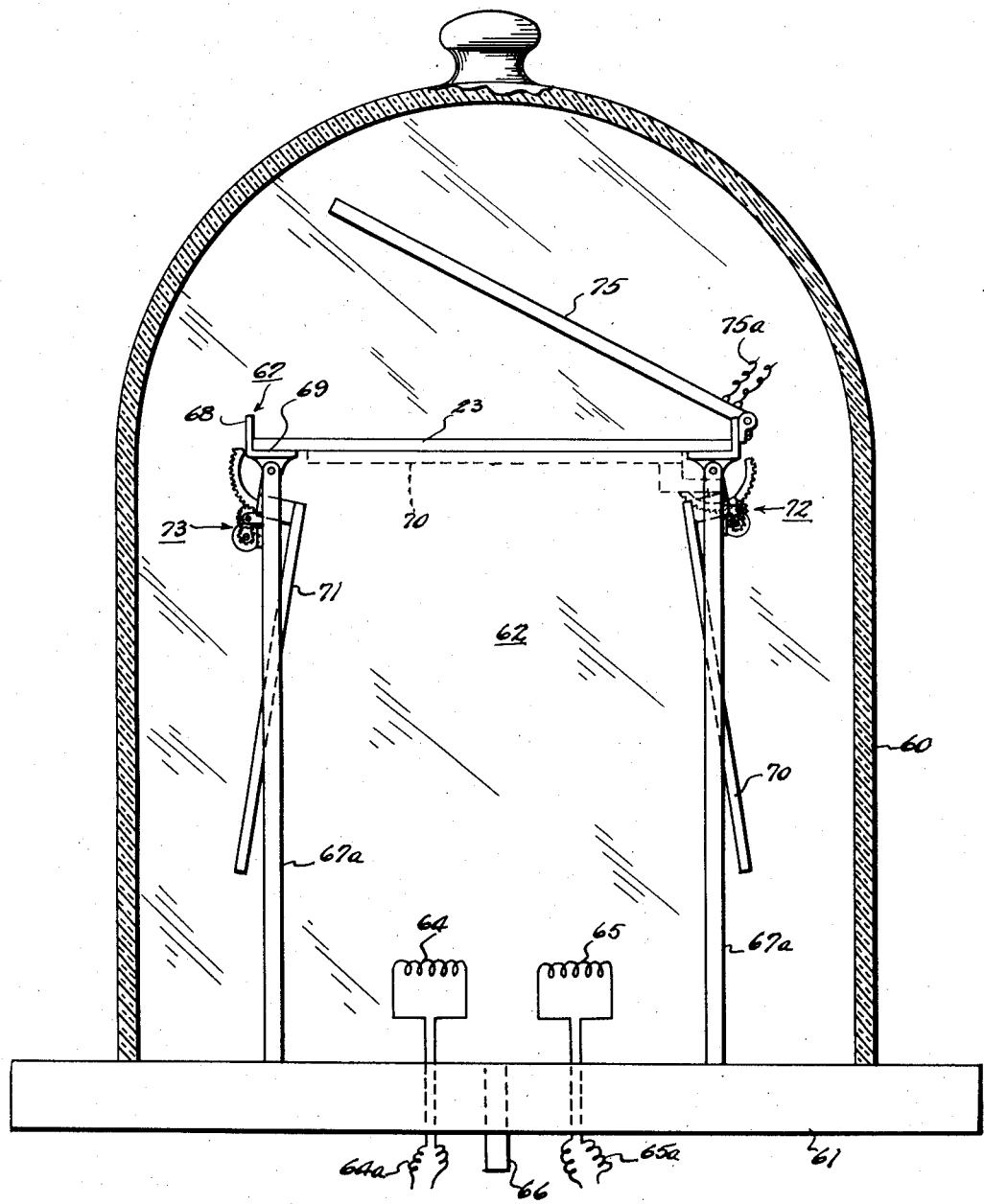

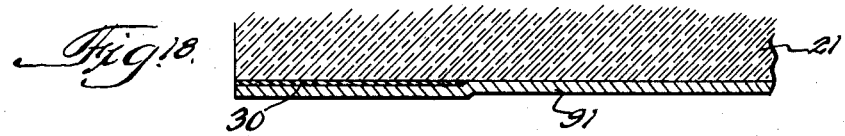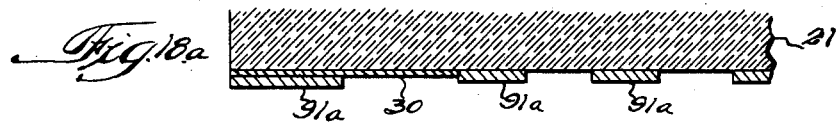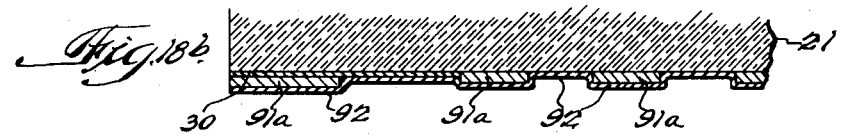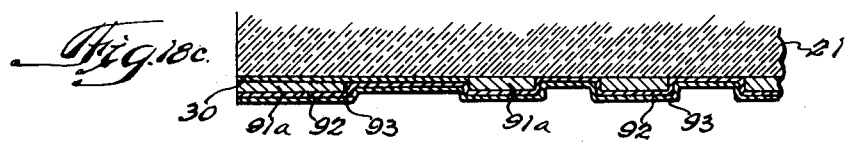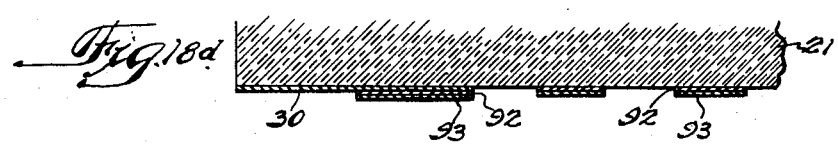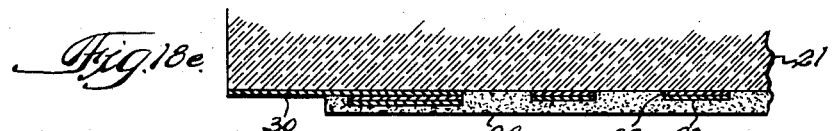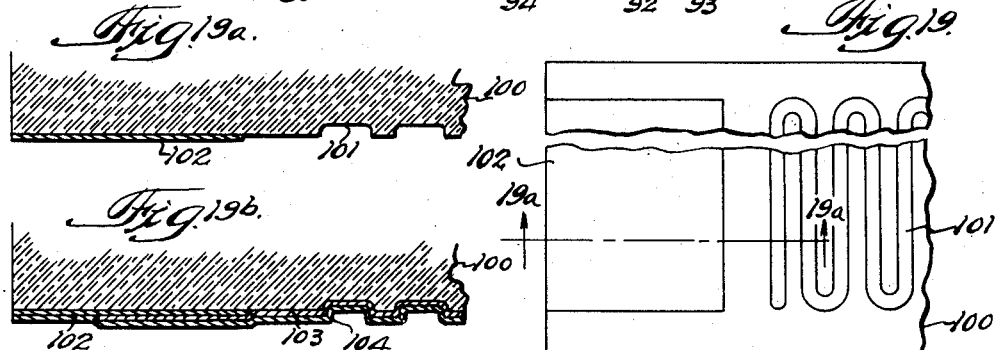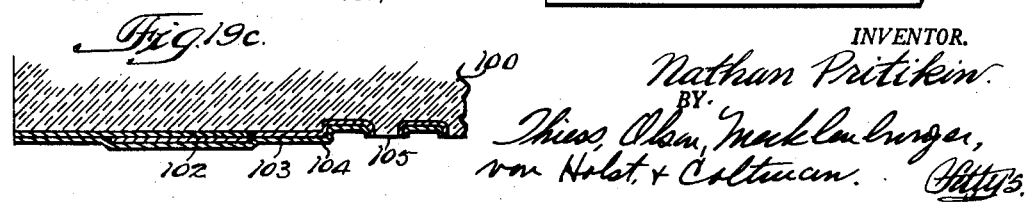

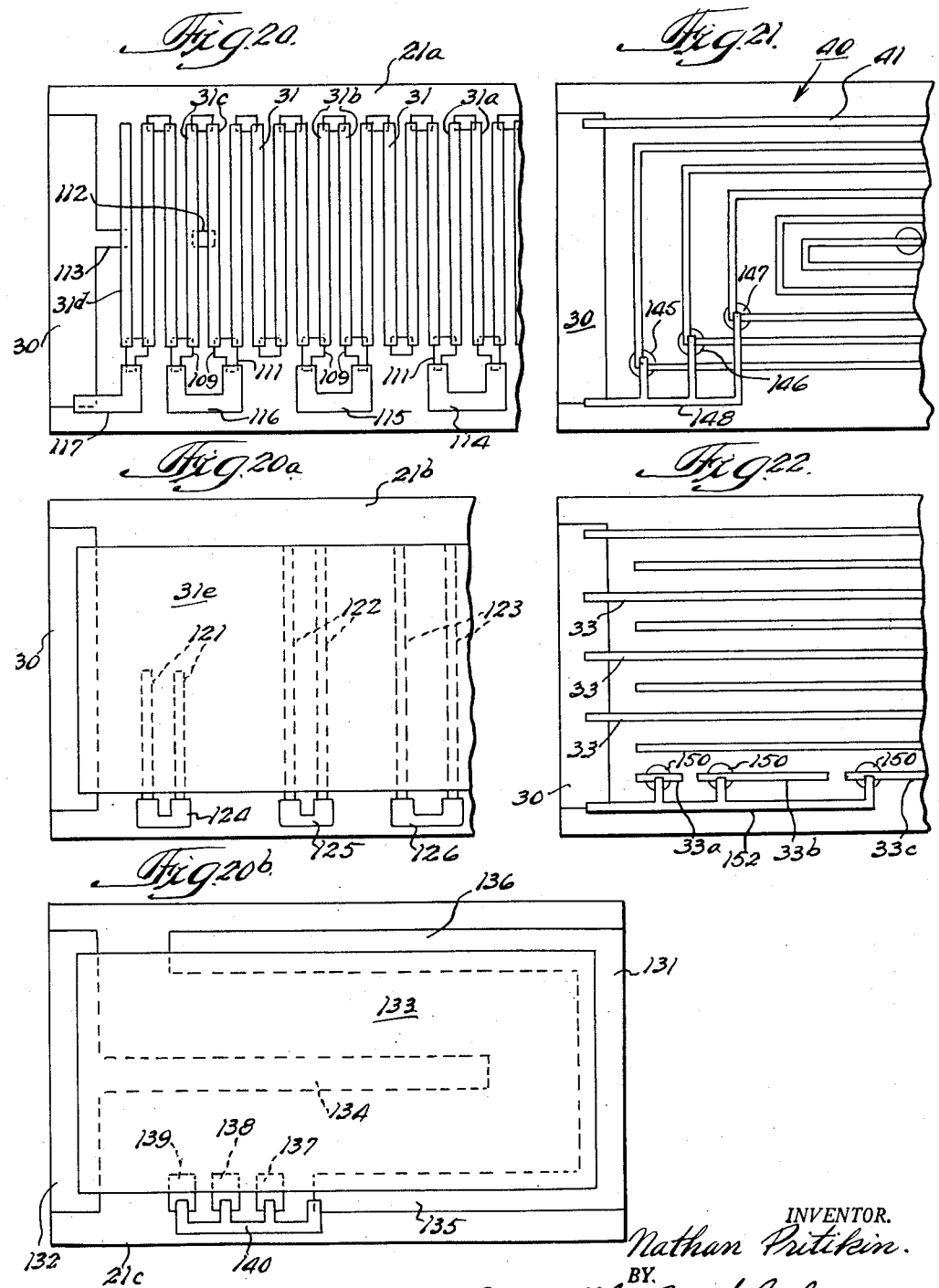

United States Patent Office 2,910,766
Patented Nov. 3, 1959

2,910,766
METHOD OF PRODUCING AN ELECTRICAL COMPONENT

Nathan Pritikin, Chicago, Ill.

Application February 24, 1953, Serial No. 338,207

1 Claim. (Cl. 29—155.5)

This invention relates to an electrical component and a method and apparatus for producing the same. It is an object of the invention to provide an improved article and an improved method and apparatus of that character.

In accordance with one embodiment of the invention an electrical component is constructed of two small sheets of glass. One of these sheets is grooved at two points to receive conducting leads. The other sheet has on one or both of its principal surfaces the desired electrical element, for example, a resistance element. The two sheets of glass are cemented or otherwise secured to each other in face-to-face relationship whereby the leads are firmly held in place between the two sheets of glass. The electrical element may be on either the exposed or concealed surface, or on both surfaces of the second mentioned sheet of glass. Preferably, however, the element is on the concealed surface only, whereby it is thoroughly insulated in the assembled component. Contact is obtained between the ends of the element and the respective leads by any one of various suitable techniques.

Accordingly, it is another object of the invention to provide an improved electrical component in which the electrical element is thoroughly insulated. It is another object of the invention to provide an improved method and apparatus for producing such an electrical component.

It is another object of the invention to provide an improved electrical component in which the leads are securely anchored in their desired positions. It is another object of the invention to provide an improved method for producing such a component.

It is another object of the invention to provide an improved electrical component which is substantially impervious to moisture. It is another object of the invention to provide an improved method and apparatus for producing such a component.

It is another object of the invention to provide an improved electrical component which is durable, stable, efficient, and small in size while being inexpensive to manufacture.

According to the preferred embodiment of the invention, each of the two glass sheets forming the main body of the electrical component is produced, at least in part, in large lots, as a part of a larger sheet of glass. For example, a large sheet of glass may have grooves formed therein for several hundred pairs of leads, this large sheet subsequently being cut into strips and finally into small individual sheets for individual electrical components. Similarly, another large sheet of glass may have formed thereon, by any one of various processes, a large number of the desired electrical elements, along with terminals and insulation, following which the large sheet is cut into strips and finally into several hundred individual electrical component parts.

Accordingly, it is another object of the invention to provide an improved electrical component which readily lends itself to production en masse. It is another object of the invention to provide an improved method and apparatus for producing electrical components en masse.

Still further, it is preferred that the electrical elements for certain electrical components be produced by the evaporation of metals and of insulating material. Novel apparatus and various novel materials and methods are disclosed herein for use in the production of such electrical components.

Accordingly, it is another object of the invention to provide an improved electrical component in which at least the electrical element itself is produced by the evaporation of metal. It is another object of the invention to provide improved apparatus, materials and methods for producing such a component.

This invention, together with further objects and advantages thereof, will best be understood by reference to the following description taken in connection with the accompanying drawing, and its scope will be pointed out in the appended claim.

In the drawing in which like parts are designated by like reference numerals,

Fig. 9 is an enlarged plan view of two glass sheets, each having a recess for a single lead and leads being shown in the recesses;

Fig. 10 is an elevational view of a completed electrical component employing the component parts illustrated in Fig. 9;

Fig. 11 is an elevational view, partially in cross section, of apparatus which may be employed in making the electrical components illustrated in Figs. 3–6;

Fig. 12 is a plan view of a glass mask which may be employed in producing the electrical element of Fig. 3;

Fig. 13 is a plan view of a wire mask which may be employed in producing an electrical element substantially like that of Fig. 3;

Fig. 14 is an edge view of the wire mask illustrated in Fig. 13;

Fig. 15 is a glass mask which may be employed in producing the electrical element of Fig. 4;

Figs. 16 and 17 are plan views of glass masks which may be employed in combination to produce the electrical element of Fig. 5.

Fig. 18 is a partial cross-sectional view of a resistor part similar to that shown in Fig. 1 but illustrating the first step in a different embodiment of the invention;

Figs. 18a–18e are views similar to Fig. 18 but illustrating the resistor part thereof in various stages in manufacture;

Fig. 19 is a plan view of a resistor part constructed in accordance with another embodiment of the invention;

Figs. 19a, 19b and 19c are partial cross-sectional views of the resistor part of Fig. 19, shown in successive stages of manufacture;

Fig. 20 is a plan view of a resistor part similar to that shown in Fig. 3 but illustrating a feature of the invention whereby the resistance of the resistor element may readily be adjusted to a predetermined value;

Figs. 20a and 20b are views similar to Fig. 20 but illustrating the application of the adjusting feature of the invention to different forms of resistor elements;

Fig. 21 is a plan view of an inductance element similar to that illustrated in Fig. 5 but illustrating an adjustment feature similar to that shown in Fig. 20; and Fig. 22 is a plan view of a capacitor element similar to that shown in Fig. 4 but illustrating the adjustment feature applied thereto.

Figure 1:
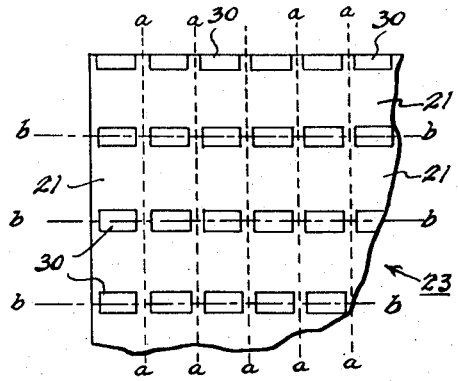
Figure 1 is a partial plan view of a portion of a large glass sheet having formed thereon terminals for a large number of individual electrical component parts.
Figure 2:
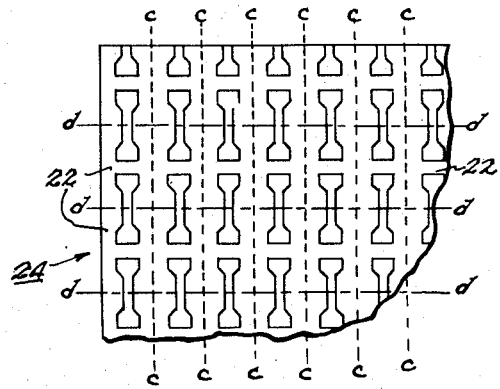
Fig. 2 is a partial plan view of a large sheet of glass in which grooves have been etched for leads for a large number of electrical component parts.

The body of the electrical component, according to one embodiment of the invention, consists of two sheets of glass 21 and 22, sheet 21 having an electrical element formed on one principal surface thereof and sheet 22 having grooves for receiving leads. Each of the sheets is preferably produced en masse as a part of a much larger sheet of glass, hereinafter referred to as a plate. A portion of such a glass plate 23 is illustrated in Fig. 1. The plate 23 is ultimately divided into a large number of small sheets 21 upon which there is formed the desired electrical element. This is accomplished by cutting, i.e., scratching, and breaking the glass plate along the lines a—a and b—b. Similarly, the glass plate 24 shown in part in Fig. 2 is ultimately divided into a large number of sheets 22 by cutting and breaking the plate 24 along the lines c—c and d—d.

In Fig. 1 the plate 23 is shown with terminals 30 formed thereon. These are the terminals between which there is later to be connected an electrical element of the desired properties. The terminals 30 may be formed in accordance with any of several well-known methods. Preferably, however, the terminals are formed by firing onto the plate 23 in the desired areas a mixture of glass frit and metal particles.

A recommended mixture consists of 10% of finely ground glass frit and 90% silver flake. This mixture may be arranged in a carrier consisting of 20% ethyl cellulose and 80% pine oil, the glass frit and metal particle mixture being mixed with carrier in about equal parts or to the consistency desired. This mixture of glass, metal and carrier can be applied to the glass plate 23 by printing, screening, painting or rolling, which processes are well understood in the art. Preferably, the mixture is screened on because of the great accuracy obtainable by this method.

After the mixture has been screened onto the plate 23 and the solvent has been permitted to evaporate or has been baked out, the entire plate is fired to a temperature which will soften the glass frit. This bonds the silver flake firmly onto the glass plate, the residue of the carrier being burned off.

It will be noted that the entire plate 23 is handled as a unit during these operations. In accordance with one embodiment of the invention the individual sheets 21 measure ½″ by ¼″ and the plate 23 is approximately 12 inches square. Accordingly, in this single series of operations, some one thousand individual sheets 21 are provided with terminals.

While the plate 23 is still intact the desired electrical component may be applied to one surface of each of these one thousand individual sheets 21 in a single series of operations. Any one of various types of electrical components may be applied to the various individual sheets 21.

Figure 3:
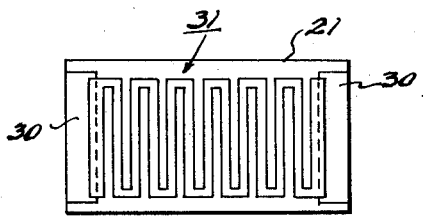
Fig. 3 is an enlarged plan view of a single electrical component part such as may be obtained in large numbers from the sheet of Fig. 1, and having a resistance film deposited thereon.

In Fig. 3 there is shown a resistance element 31 which is arranged in a sinuous pattern in order to obtain a high resistance value. Preferably the resistance element 31 is an evaporated film of chromium covered by a protective film of silicon monoxide or magnesium fluoride, the protective film being applied by evaporation in the same vacuum as the conducting film whereby the conducting film is never exposed to oxygen. Such a process, and the resistor obtained thereby, is disclosed and claimed in application Serial No. 299,797, entitled Electrical Resistor and Method and Apparatus for Producing Resistors, filed July 19, 1952, now Patent No. 2,849,583, by the same inventor. It will be noted that the ends of the resistance element 31 overlap the terminals 30 whereby the resistance element is electrically connected to these terminals.

Figure 4:
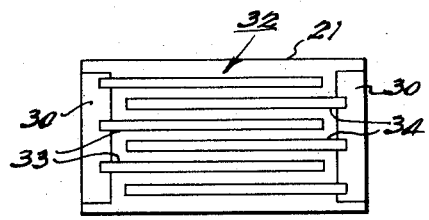
Fig. 4 is a view similar to Fig. 3 but having a capacitor element deposited thereon.

By the same basic process described in greater detail below, a condenser or capacitor element 32 may be formed, such as is seen in Fig. 4. According to this particular embodiment plate segments 33 and plate segments 34 of the condenser element 32 lie in the same plane, that is, they lie on one principal surface of the glass sheet 21 and therefore may be deposited in a single evaporation of the desired metal. The plate segments 33 overlie and electrically contact only the terminal 30 at the left hand side of Fig. 4 while the plate segments 34 overlie and electrically contact only the terminal at the right-hand side.

Figure 5:
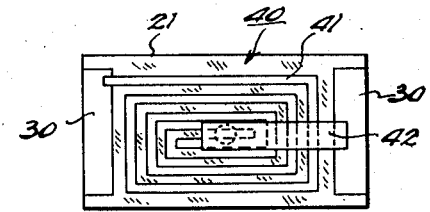
Fig. 5 is a view similar to Fig. 3 but having an inductance element deposited thereon.

In Fig. 5 there may be seen a glass sheet 21 having formed thereon an inductive element 40 consisting of a generally spiral conducting film 41. It will be noted that one end of the conducting film engages one of the terminals directly, and that the other end of the spiral winding is shown connected to the other terminal by a second conducting film 42. The latter may be applied after the glass sheet 21 has been removed from the vacuum chamber in which the winding 41 and a protective coating are preferably applied to the sheet 21. Means for establishing electrical contact between the film 42, which may be a conventional organic conducting paste, and the central terminal of the spiral winding 41 is explained below. Preferably a layer of insulating material such as a thermosetting plastic is applied to the area to be covered by the conducting film 42 since the evaporated protective film will not normally withstand the test voltage commonly applied to a component of this character.

Figure 6:
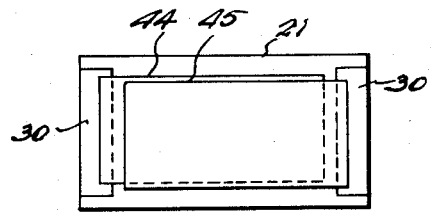
Fig. 6 is a view similar to Fig. 3 but having semiconductive material deposited thereon to form a rectifying diode.

Still another application and embodiment of the invention is illustrated in Fig. 6 wherein there is disclosed an electrical element involving semi-conducting materials. In the specific embodiment illustrated in Fig. 6 this element is a diode or rectifier. This element consists essentially of two evaporated films 44 and 45, which are shown in Fig. 6 as being vertically staggered purely in the interest of clarity.

The film 44 is originally a titanium film of approximately ½ mil thickness. Subsequent to deposition by evaporation it is subjected to a steam atmosphere at approximately 400° C. to convert at least the exposed surface to titanium dioxide. Subsequently, a film 45 of silver is deposited by evaporation. This film is also of relatively great thickness for an evaporated film in order to reduce resistance to the flow of current therealong.

It will be noted that the film 44 overlaps the left-hand terminal 30 but terminates short of the right-hand terminal. Conversely, the film 45 overlaps the right-hand terminal but terminates short of the left-hand terminal.

Figure 7:
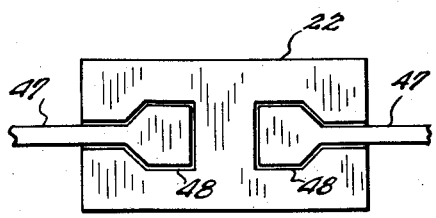
Fig. 7 is an enlarged view of a single component part such as may be obtained in large numbers from the large sheet illustrated in Fig. 2, and showing leads properly placed in the grooves.
Figure 8:
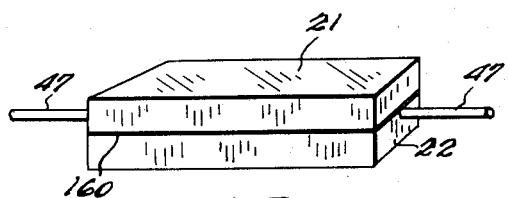
Fig. 8 is an enlarged view of a completed electrical component constructed in accordance with one embodiment of the invention.

In all of the applications and embodiments of the invention so far described only two terminals 30 are required in each electrical component. In such case leads 47 are preferably arranged as illustrated in Figs. 7 and 8. In Fig. 7 there is shown a single one of the glass sheets 22, which are taken in large number from the plate 24 of Fig. 2. In each of the sheets 22 a pair of recesses 48 are formed which have sufficient depth to receive the leads 47. It is recommended that the leads 47 be swaged at their inner ends whereby they may be more securely imbedded in the ultimate electrical component, and whereby they may more readily carry away any heat generated by the electrical element. In such case the recesses 48 are shaped as shown in Figs. 2 and 7 to receive leads of this configuration.

It is to be understood that the recesses 48 are formed in the plate 24 of Fig. 2 by grinding, blasting, etching or molding. Forming of the recesses 48 in the large plate 24 permits this operation to be performed on a large number of sheets 22 in a single operation or series of operations.

In order to insert the leads 47 into the recesses 48 it is necessary, of course, that the large plate 24 be cut and broken along the lines d—d of Fig. 2. Preferably, however, the sheets 22 are retained in the form of long strips extending horizontally in Fig. 2 at the time the leads are inserted in the recesses 48. Such strips of sheets 22 may be backed by a strip of adhesive tape of any suitable form, following which the strip may be broken into individual sheets 22, the sheets being retained in strip form by the adhesive tape. The sheet 24 is preferably cut on the side opposite the recesses 48 and, accordingly, the tape employed is preferably capable of resiliently stretching the amount necessary to permit breaking apart of the individual glass sheets 22.

The leads 47 may then be arranged in a jig such that leads for an entire strip of sheets 22 may be inserted in one operation.

Following insertion of the leads in the recesses of sheets 22, a strip of sheets 21 upon which the desired electrical elements have been formed, is placed against the strip of sheets 22 with a suitable adhesive therebetween. The strip of sheets 22 is also preferably cut, broken and held in a strip by tape.

One general form of adhesive which has been found to be satisfactory for binding together the glass sheets 21 and 22 is thermosetting plastic. Electrical contact between the leads 47 and the respective terminals 30 can be assured by application of a conductive plastic mixture to the terminals 30 or to the leads 47 adjacent the ends of the sheet 22. A satisfactory material of this character is Du Pont No. 4929 conducting paste.

Following thermal setting of the adhesive and of the plastic conducting compound arranged between the terminals and the leads, the electrical components are complete. The tapes which hold the components together in strips may now be removed or may be retained such that the components may conveniently be handled in groups.

In some applications of the invention it is desired that three or more terminals be employed. Such applications include transistors and various combinations of electrical elements such as series, parallel and electrically independent combinations of resistances, inductances, capacitors and electrical elements involving semi-conductors. In such case two or more leads may be arranged to extend outwardly of one edge of the glass sheets 22. More specifically, the glass sheets may be made larger, the leads may extend outwardly of the longer edges, or the leads may be swaged to a lesser extent such that two leads may be brought out over one of the shorter edges of the glass sheet 22. Preferably, however, leads extend out over only two opposed edges of the sheet 22 in order that the final assembly of the electrical components may be accomplished with the sheets 21 and 22 in strip form.

Another arrangement of leads is illustrated in Figs. 9 and 10 in which a pair of glass sheets 22a each have a single recess 48 for leads 47. This arrangement may be desired in an application of the invention wherein an electrical element is to be arranged between the two glass sheets and has terminals on opposite surfaces thereof. In such case the electrical element may, if desired, be constructed as a unit independently of both of the glass sheets. An assembled unit of this character is illustrated in Fig. 10 in which an electrical element 49 is shown sandwiched between the two glass sheets 22a. It will be noted that one of the leads 47 lies immediately below the electrical element 49 while the other lead lies immediately above the electrical element.

All of the electrical elements illustrated in Figs. 3, 4, 5 and 6 may be formed by evaporation of various materials. Various apparatus is illustrated in Figs. 11–17 by which the necessary evaporation process may be performed and controlled.

The apparatus illustrated in Fig. 11 includes a conventional bell par 60 resting upon a suitable base 61 to define a vacuum chamber 62. Arranged within the bell jar 60 are a pair of heaters or filaments 64 and 65 for evaporating the various conducting and non-conducting materials required for the formation of the desired electrical element.

The filaments 64 and 65 are separately energizable through leads 64a and 65a extending through the base 61 and connected to a power source through suitable controls, not shown in the drawings. It will be understood that any reasonable number of filaments may be provided for successive evaporation of various materials.

A connection 66 is provided in the base 61 for withdrawing the air in the vacuum chamber 62 prior to evaporation. The connection 66 also may be used for permitting air to return to the vacuum chamber after the evaporation has been completed. The same connection 66 or a different connection may be employed for allowing the entrance of steam as is recommended above in the production of the diode of Fig. 6. For practical reasons, however, it is considered preferable that the glass sheet be removed from the vacuum chamber for subjection to this high temperature steam.

A framework 67 is provided for holding the glass plate 23 upon which an electrical element is to be deposited by evaporation. This framework may comprise primarily four angle members, for example, angle iron, having vertical legs 68 for positioning the glass plate 23 laterally and horizontal legs 69 for supporting the glass plate. The entire framework may be supported by any suitable legs 67a.

A pair of masks 70 and 71 are provided for screening the stream of particles emanating from the heaters 64 and 65, the masks being described in detail below. Each of the masks is pivotally mounted as shown and is provided with power-operated means 72 and 73, respectively, for swinging the respective masks between the positions illustrated in solid lines in Fig. 11 and a position immediately below the glass plate 23, illustrated for the mask 70 in dotted lines. Any suitable form of remote controlled power means 72 and 73 are provided in order that the masks may be brought successively into screening position without removing the bell jar 60 and without subjecting the various deposited films to oxygen.

A heater 75 is preferably provided to heat the glass plate 23 prior to and during the evaporation process. As is well understood in the art, it is important to maintain the glass plate 23 at the proper temperature during the evaporation process. The heater 75 is preferably mounted pivotally, as shown, in order that it may be raised when it is desired to place a glass plate in the frame 67 or remove the plate therefrom. Leads 75a are illustrated which may be connected to a power source through suitable controls for maintaining the proper temperatures of the glass plate 23.

In Figs. 12–17 there are illustrated a number of masks of differing construction and of different pattern which may be used in the deposition by evaporation of the various electrical elements specifically shown in Figs. 3–5. In Fig. 12 there is illustrated a glass mask 80 suitable for use in producing the resistance element of Fig. 3. The mask 80 consists of a sheet of glass having a groove 81 of the desired configuration etched therethrough.

In Figs. 13 and 14 there is illustrated a wire mask 82 which may be employed in the production of various electrical elements requiring a fine pattern. This mask comprises a frame 83 defining rectangular openings 83a therethrough. Along two opposed edges there are arranged properly spaced pins 84, and a wire 85 is wound around these pins and back and forth across the openings 83a, as shown.

It will be apparent that where this mask is used the deposition of conducting material by evaporation will be restricted to the narrow spaces between adjacent wire lengths. This mask can be used, for example, in the production of the resistance element of Fig. 3, spots of conducting material similar to the terminals 30 being arranged along opposite edges of the glass sheet 23 to so connect the ends of the deposited strips as to produce a sinuous conducting path. This specific method, and the resistance element which may be produced thereby, are disclosed and claimed in application Serial No. 299,797 referred to above and accordingly is not described in detail herein.

It will be noted that the mask illustrated in Fig. 13 is suitable for masking a large sheet of glass containing a large number of individual electrical component parts. The glass mask 80 illustrated in Fig. 12 may also be made in multiple form such that it may serve to mask the plate 23 upon which there is to be deposited a large number of resistance elements.

In Fig. 15 there is illustrated a glass mask 86 having a series of slots 87 and 87′ therein. The mask 86 is specifically intended for use in the production of the condenser element illustrated in Fig. 4. It will be noted that the slots 87 extend farther to the left than the slots 87′, whereby the conducting film deposited by evaporation through the slots 87 may contact a left-hand terminal 30, while the conducting film deposited through the slots 87′ will terminate short of the left-hand terminal. At the right-hand end of the mask 86 the reverse is true, the slots 87′ extending over the right-hand terminal 30 and the slots 87 terminating short of the right-hand terminal.

Figs. 16 and 17 show a pair of masks 88 and 88a suitable for the production of the inductance element of Fig. 5. Comparison of Figs. 16 and 17 with Fig. 5 reveals that slots 89 in the mask 88 are so arranged as to produce the horizontal conducting strips of the inductance element, while slots 89a in the mask 88a are so arranged as to produce the vertical conducting strips of the inductance element.

The patterns of the elements illustrated in Figs. 3, 4 and 5 and the corresponding patterns of the masks illustrated in Figs. 12–17 are relatively coarse, in the interest of clarity in the drawings. It is to be understood, however, that the various glass masks and wire masks are readily produced with very fine patterns such that a very narrow conducting strip may be deposited where desired in the production of the various illustrated electrical elements. For example, it has been found possible to obtain through the use of masks, such as those illustrated, conducting lines or strips on the order of .001 inch in width.

Reference has been made above to the fact that silicon monoxide is preferred as a protective film rather than magnesium fluoride, which is commonly employed for such purpose. It has been found that silicon monoxide forms a much more effective barrier to the passage of oxygen than does magnesium fluoride. The latter has no tendency to combine with oxygen and hence any oxygen which finds its way to the surface of the magnesium fluoride film may, in time, penetrate the film and come into contact with the underlying film of metal.

As opposed to this, silicon monoxide is deficient in oxygen, that is, it tends to capture oxygen which comes into contact therewith. This is a distinct advantage, particularly, but not exclusively, in instances wherein the resistance of the deposited metal film is of significance. The silicon monoxide acts as a sponge to absorb any oxygen which reaches the outer surface of the film before such oxygen may pass through the film of silicon monoxide to contact and combine with the underlying metallic film. Combining of oxygen with the silicon monoxide to form silicon dioxide provides a very dense film which is a substantially impenetrable barrier to the passage of oxygen.

Reference has also been made above to the fact that electrical contact can be made with the deposited metallic film directly through the overlying film of silicon monoxide or magnesium fluoride. This has been found to be an outstanding advantage both in establishing contact between the terminals 30 and the leads 47 and in establishing contact between the painted strip 42 of Fig. 5 with the center of the inductance coil and one of the terminals 30.

Contact between the conducting paste and the deposited film, or the terminals, directly through the deposited film of silicon monoxide or magnesium fluoride is obtained by virtue of the rough surface of the underlying terminal 30. The probable explanation of this phenomenon is that the silicon monoxide or magnesium fluoride, in the thicknesses employed, fails to form a continuous insulating film over the rough surface of the terminals 30. Accordingly, when the metallic or conducting paste is applied it makes contact through the protective film with the underlying terminal at innumerable small points. The presence of an evaporated metallic film between the terminals 30 and the protective film appears to have no effect on this phenomenon.

In the instance of the inductance element of Fig. 5, it is desirable that a fired-on conducting spot be arranged at the center of the element directly on the glass sheet, whereby contact may be established through the protective film between the painted strip 42 and the deposited metallic film.

Where two masks are to be employed in the evaporation process for a single electrical element, as for example in the case of the masks 88 and 88a of Figs. 16 and 17, used for the production of the inductance element of Fig. 5, the two masks may be mounted as suggested in Fig. 11, wherein two masks are indicated by the numerals 70 and 71.

Two masks may also be used in this manner in the production of the diode or rectifier of Fig. 6, each mask having a simple rectangular opening for allowing the deposition of one or the other of the films 44 and 45. As previously indicated, however, it is preferable that the particular rectifier element of Fig. 6 be withdrawn from the vacuum chamber, following deposition of the film 44, for subjection to high temperature steam prior to deposition of the film 45.

It is to be understood that all of the masks discussed above may be duplicated the required number of times in a single body to permit masking or screening in evaporating films onto a large plate such as the plate 23 of Fig. 1.

In place of the masks so far illustrated, a desired configuration of evaporated film may be obtained through the use of a photographic mask. This alternative embodiment of the invention in regard to the formation of electrical elements is illustrated in Figs. 18—18e. In this embodiment of the invention, a glass sheet 21 may be used which is identical to the glass sheets 21 illustrated in Fig. 1, including the terminals 30 adhereing to opposite edges thereof. A photosensitive coating 91 is first applied to the surface of the sheet 21 to which the evaporated film is ultimately to be applied, as illustrated in cross section in Fig. 18. This may be, for example, a bichromated colloid such as fish glue. Such special emulsions are well known in the art.

The emulsion is next exposed to activating radiations in a pattern which is the reverse or negative of the desired ultimate pattern of the conducting film. The emulsion is then developed by washing in water (where the photosensitive material above referred to is employed), the water washing away the nonactivated portions thereof. The developed coating 91a, seen in Fig. 18a, may be of a pattern identical to that of the glass mask illustrated in Fig. 12. The photographic coating 91a, in fact, serves substantially the same purpose as the masks illustrated in Figs. 12 and 13.

The glass sheet 21, with the photographic coating 91a of desired pattern adhering thereto, may, after proper cleaning, be placed in the vacuum 62. A film 92 of chromium or other metal is then deposited over the entire surface of the glass sheet, producing the result illustrated schematically in Fig. 18b. A coating 93 of magnesium fluoride, or other suitable protective material, is then deposited on the metal resistance film 92, the glass sheet then appearing as illustrated schematically in Fig. 18c.

When the glass sheet has been removed from the vacuum chamber, it is next subjected to a solvent such as sodium hypochlorite which is relatively inactive with respect to the metallic film and the protective coating but which serves to dissolve the developed photographic coating 91a. It has been found that this solvent will readily penetrate both the magnesium fluoride or silicon monoxide coating and the metallic film to attack and dissolve the photographic coating. The reason for this penetration is not known certainly but it is believed that the relatively rough and porous surface of the photographic coating prevents the formation of a continuous thin film of metal or protective coating thereon. When the photographic coating is so dissolved and washed away it carries with it the overlying portions of the metallic film and protective coating. This leaves the glass sheet appearing as is schematically illustrated in Fig. 18d.

It will be apparent that with this method a metallic film is obtained which is protected at all times from exposure to atmosphere over the principal surfaces thereof by the glass sheet and by the protective coating. It will also be apparent, however, that the edges of the metallic film are exposed to atmosphere following the removal of the protographic emulsion. This results in some instability of the film and, for this reason, this photographic method is considered inferior to the methods employing the masks of Figs. 12-17.

As soon as possible after the glass sheet has been brought to the condition illustrated in Fig. 18d and thoroughly cleaned, a coating 94 is preferably applied further to protect the resistance film as well as to provide further electrical insulation and mechanical protection thereof. The glass sheet 21 then appears as schematically illustrated in Fig. 18e and is ready for assembly with the glass sheet 22 and leads 47 in the manner illustrated in Fig. 8 and described above.

It will be apparent that this photographic method lends itself to production of resistors en masse. This method is, in fact, another embodiment of the invention whereby electrical elements may be applied to the plate 23 and in each step of the method the large plate 23 may be handled just as readily as a single resistor part 21.

Still another embodiment of the invention is disclosed in Figs. 19 and 19a, b and c. In this embodiment of the invention a glass sheet 100 is first etched to produce a circuitous groove 101 having a depth preferably on the order of .0002", a groove of this depth readily being etched in a very fine pattern. Preferably, but not necessarily, the groove terminates substantially inwardly of the ends of the glass sheet 100 as indicated in Fig. 19.

A terminal 102 is then applied at each end of the sheet 100 in a manner identical to that described above in connection with the terminals 30. The sheet 100 is then in the condition illustrated schematically in Figs. 19 and 19a.

After the sheet has been properly cleaned it is ready for deposition of a metallic film 103 and a protective coating 104 over the grooved surface of the sheet to produce a construction such as is illustrated in Fig. 19b.

In this figure, as in many other figures in the application, the thickness of the metallic and protective films is greatly exaggerated in order that they may be given finite thickness without resorting to such a large scale of drawing that all perspective is lost. In the embodiment of the invention as actually produced, the depth of the groove 101 is approximately .0002" as previously indicated, while the thickness of the metallic and protective film in combination is on the order of ten millionths of an inch, or approximately one-twentieth of the depth of the groove.

After deposition of the desired films, the sheet 100 may be removed from the vacuum chamber 62 and subjected to polishing by a fine grain abrasive such as rouge or Barnesite, such abrasive preferably being arranged on a narrow and relatively resilient wheel. The abrasive may, for example, be embedded in a soft copper band mounted on a soft, resilient wheel. The abrasion operates to remove those portions of the metallic and protective films which are deposited upon the ridges 105 between the grooves 101, and only in that area of the glass sheet 100 lying appreciably inwardly of the terminals 101. In Fig. 19c it will be noted that the metallic film 103 has been completely removed from the ridges 105 whereby a continuous current path is found only along the circuitous groove 101. It will also be noted in Fig. 19c that the metallic film 103 and the overlying protective coating 104 remain unbroken over the surface of the glass sheet 100 between the inner edge of the terminals 102 and at least some portion of the first leg of the groove 101, this being necessary in order to establish electrical connection between the terminals and the resistive film deposited in the grove 101.

The embodiment of the invention disclosed in Figs. 19—19c has the advantage that no mask is required and that the groove 101 is readily formed in the glass sheet 100 in a very fine pattern because of its shallowness. However, this embodiment has the disadvantage of the embodiment illustrated in Figs 18—18e, namely, that the edges of the metallic film are exposed at atmosphere at least for a short interval between the polishing operation and a subsequent application of additional insulation and/or an additional protective coating. Even though this time interval may be made very small, nevertheless some oxidation occurs, with the undesirable results explained in detail above. For this reason the embodiment of the invention disclosed in Figs. 19—19c is considered less desirable from the standpoint of producing a suitable resistor than the preferred embodiments described above in connection with Figs. 1–17.

This embodiment of the invention is limited in application to the formation of fine patterns, such as is intended to be suggested by Figs. 3, 4 and 5. More specifically, it is not practical where the deposited films are to be left intact over large areas, as in the case of the element shown in Fig. 6.

This embodiment of the invention, like all embodiments of the invention described above lends itself readily to mass production of resistors. More specifically, each of the glass sheets 100 forming the base of a resistance element may be and, in fact, preferably is, a small segment of a much larger sheet of glass, such large sheet being, for example, 12" square and readily containing or comprising one thousand of the glass sheets 100.

As has previously been indicated, it is possible to produce a resistor by the foregoing methods having a resistance value very close to any desired predetermined value. More specifically, a predetermined value can be obtained within ±3 to 5%, and substantial experience in the production of such resistors may result in controlling the resistance value much more closely. In any event still more precise resistance values may be obtained by a method illustrated in Figs. 20, 20a and 20b.

In Fig. 20 there is illustrated a resistor which, by way of example, is similar to that illustrated in Fig. 3. The glass sheet 21a employed in this embodiment of the invention is substantially identical to the glass sheet 21 of Fig. 1. However, conducting spots 109 are provided on the sheet as shown. These may be similar to the spots recommended for connecting ends of lines of resistance film where the mask of Figs. 13 and 14 is used. These spots may, in fact, be used for that purpose. They also include outwardly extending legs 111, as shown. An additional conducting spot 112 is arranged near the center line of the resistor element, and a conducting bridge 113 connects the terminal 30 to the resistance element 31 near the center line thereof. The outwardly extending legs 111, the conducting spot 112 and the bridge 113 are the same material as that recommended above for the terminals 30.

After the resistance element 31 and the protective coating have been deposited on the glass sheet 21a by evaporation and after the glass sheet has been removed from the vacuum chamber 62, conducting paste, such as that recommended above for assuring connection between the leads 47 and the terminals 30, is painted, rolled or screened onto the surface of the glass sheet 21a to form connecting links 114, 115, 116 and 117 between adjacent ones of the conducting spots 109 and between one such spot and the terminal 30, as shown in Fig. 20. Contact between these connecting links and the associated conducting spots 109 or the terminal 30 is obtained by virtue of the fact that the silicon monoxide or magnesium fluoride protective coating apparently fails to form a continuous film over the rough surfaces of these conducting spots and the terminal. In any event, and whatever the true explanation may be, it has been found that the connecting links 114–117 make firm electrical contact with the conducting spots and the terminal even though the latter have been subjected to the deposition of evaporated silicon monoxide or magnesium fluoride.

It will be apparent upon reference to Fig. 20 that the connecting link 114 short-circuits the two legs or bars of the resistor element 31 which are designated 31a in Fig. 20. Similarly the connecting link 115 short-circuits the bars 31b. Still further the conducting spot 112 short-circuits the upper half of each of the bars 31c while the connecting link 116 short-circuits the remaining or lower half of these bars. Finally, the connecting link 117 short-circuits the lower half of the bar 31d.

If the resistance of the resistor element with the connecting links 114–117 connected as shown, is of the proper or desired value, the resistor may be assembled as described above without adjustment. Where the adjustment features illustrated in Fig. 20 are employed, however, it is recommended that the resistance value be made slightly lower than the desired value. In such case the actual resistance is measured and if found, in fact, to be too low, selected ones of the connecting links 114–117 may be broken merely by wiping or cutting the same, whereby the short-circuiting of various bars or portions thereof is eliminated. In this regard it should be noted that the connecting links are of relatively soft conducting paste which can readily be broken or even substantially removed.

Let it be assumed that the resistor element 31 in Fig. 20 includes fifty individual bars. Each bar then represents 2% of the total resistance value. If it is found that the resistance value is approximately 4% too low, the connecting link 114 or the connecting link 115 may be broken whereby two additional bars 31a or 31b are effectively placed in the resistance circuit and whereby the resistance value is increased by 4%. If the resistance value is found to be approximately 2% too low, the connecting link 116 may be broken whereby the lower half of each of the bars 31c is effectively placed in the resistance circuit and whereby the resistance value is increased approximately by 2%. Similarly, if the resistance value is found to be approximately 1% too low the connecting link 117 may be broken whereby the lower half of the resistance bar 31d is placed in the circuit and the total resistance is increased by approximately 1%.

It will be apparent that increases of resistance can be made up to and including 11% by breaking or cutting all of the illustrated connecting links, and that the total resistance may be increased in steps of 1% provided that the total increase required is determined in advance. It will also be apparent that additional connecting links may readily be employed to permit further increase in resistance and that by proper placing of the conducting bridge 113 or of one or more conducting spots 112 an increase in resistance can be made possible, which is only a fraction of 1%, for extremely precise requirements.

It is contemplated that the resistance of the resistors, as manufactured, be tested by automatic machinery which travels along the strips of resistor elements 21a with the resistance element and the protective coating deposited thereon and while still in the form of a large sheet such as the plate 23 of Fig. 1. It is believed to be a relatively simple matter to provide testing apparatus which will progress along the sheet and measure the resistance of each resistor. It is further contemplated that a knife edge or scratching point be made to progress along the length of each resistor element during or immediately following the testing of each resistor. It is still further contemplated that apparatus be provided which is responsive to resistance measurements for raising and lowering the knife edge as it so moves. Accordingly, the testing apparatus may be so adjusted that when the resistance of a particular resistor is too low, by a certain percentage, the knife edge will be lowered as it passes over one or more of the connecting links 114–117, the severing of which will increase the resistance by the amount necessary to produce the desired total resistance.

While such testing apparatus is not disclosed in the drawings and does not form a part of the present invention, it will be apparent that it is desirable, in contemplation of the use of such machinery, that the portions of the links 114–117 which are selectively to be severed lie in a straight line, preferably, but not necessarily, parallel to the general direction of flow through the resistor. It will be noted that this is the case in the embodiment of the invention illustrated in Fig. 20 whereby the use of a testing and adjusting machine such as that suggested above is made possible.

As indicated above, the metallic resistance film according to the preferred embodiment of the invention is of such thickness and resistivity as to provide a resistance in the order of one thousand ohms per square. In order to produce resistors of high resistance, i.e., having a resistance of several thousand ohms or several megohms, it is necessary to resort to the circuitous patterns described above to obtain an increased ratio of length-to-width while still maintaining a resistor of the proportions suggested above.

Where the desired resistance is on the order of two thousand ohms or substantially less, a solid, i.e., substantially rectangular, resistance film may be employed. Such a resistance film and means for adjusting the resistance value thereof are illustrated in Fig. 20a. In the illustration of this embodiment of the invention a glass sheet 21b is shown having terminals 30 adhering thereto, this portion of the resistor being identical to that illustrated in Fig. 1. In addition to the terminals 30 there is deposited on the glass sheet 21b a series of pairs of substantially parallel strips of conducting material 121, 122 and 123. These strips may be of the same material and formed in the same manner as the terminals 30.

A metallic resistance film 31e is deposited in a rectangular pattern as illustrated in Fig. 20a and a protective coating, preferably of silicon monoxide, is deposited thereover in a vacuum in the same manner as described above in connection with previously described embodiments of the invention. In this instance, of course, a relatively simple mask is required to limit deposition of the metallic resistance film to the desired rectangular area. The conducting strips 121, 122 and 123 are so positioned on the sheet 21b that one end of each extends beyond one edge of the resistance film 31e.

After the sheet 21b has been removed from the vacuum chamber a series of connecting links 124, 125 and 126 are painted, rolled or screened onto the sheet in such position that the ends of each connecting link overlie the exposed ends of a pair of strips 121, 122 or 123, as shown. Again the rough surface of these strips prevents formation of a continuous film of silicon monoxide, whereby the conducting links 124, 125 and 126 may make firm electrical contact with the respective strips.

Since the resistance of the material forming the strips 121, 122 and 123 is negligible compared to that of the resistance film 31e it will be apparent that the link 126, for example, short-circuits the resistance film lying between the two strips 123. Similarly, the link 125 short-circuits the resistance film lying between the strips 122. The width of the strips is of no material consequence but the width of the resistance film between the strips is significant in that it is this film which is short-circuited by the respective links and which may be inserted in the current path by interruption of the corresponding links. In the illustrated embodiment the width of the resistance film between the strips 123 is twice as large as the width of the resistance film between the strips 122. The resistance of the film between the strips 123 may, for example, represent approximately 4% of the total resistance whereas the resistance of the film between the strips 122 represents approximately 2% of the total resistance.

The width of the film between the strips 121 may be equal to that between the strips 122 as illustrated. However, since the strips 121 extend only half way across the resistance film, it will be apparent that the link 124 short-circuits only a fraction (approximately one-half) of the 2% of total resistance short-circuited by the link 125. The purpose of the abbreviated strips 121 is to provide more sensitive adjustment of the total resistance than would be possible with the strips 122 and the link 125 with a given small distance between such strips.

It will readily be seen that adjustments up to approximately 7%, in steps of 1%, may be accomplished by severing selected ones of the links 124, 125 and 126. Also, it will be noted that severable portions of these links are arranged in a straight line, as in the embodiment illustrated in Fig. 20, whereby a device for scratching or wiping away these links may travel in a straight line and may be made to bear against the resistor element to interrupt selected ones of the links.

Where a total resistance is required which is very small as compared to the resistance per square of the deposited metallic resistance film, resort may be made to a pattern of terminals such as that illustrated in Fig. 20b. In this instance a glass sheet 21c is provided with terminals 131 and 132 which are arranged as illustrated to provide a relatively short and wide current path therebetween. A metallic resistance film 133 is deposited on the sheet in a rectangular pattern, along with a protective film, in the manner previously described. The largest portion of the current may pass from the leg 134 of the T-shaped terminal 132 to the legs 135 and 136 of the U-shaped terminal 131. The length of the current path is obviously only a small fraction of the width of the current path, in direct contrast to the current path illustrated in Fig. 3, for example, wherein the length of the current path is many times greater than its width. Through this device a resistance of a few ohms may readily be obtained even though the resistance per square of the resistance film may be in the order of one thousand ohms as suggested above.

It will be noted that the leg 135 of the terminal 131 is foreshortened, and in its place there is provided a series of conducting spots 137, 138 and 139. These conducting spots as well as the terminals 131 and 132 are preferably formed of the same material and in the same manner as the terminals 30. The spots 137, 138 and 139 are connected to the leg 135 of the terminal 131 by a conducting link 140, as shown, this link being of the same material as the conducting links of Figs. 20 and 20a.

It will now be apparent that the total resistance of the resistor illustrated in Fig. 20b may be increased by interrupting the link 140 since such interruption substantially increases the resistance of the current path in the lower left-hand corner of the resistance film. It will readily be understood that the link 140 should be broken, wiped away or otherwise interrupted from left-to-right in Fig. 20b in order that the total resistance may be increased in three successive steps. Again, it will be noted, the movement of a device for successively interrupting the various legs of the link 140 may be along a straight line.

In Fig. 21 a modification of the adjustment feature is shown applied to an inductance element 40 similar to that illustrated in Fig. 5. The only distinction, in fact, is the arrangement of several conducting spots 145, 146 and 147 underlying three different loops of the conducting film 41, and a connecting link 148 which is painted on after the inductance element has otherwise been completed. Preferably, the loops of the inductance element which overlie the conducting spots are suitably spaced apart such that the conducting spots may be of substantial size without coming into contact with each other or with other loops of the inductance element. It will be noted that the link 148 contains legs which extend to one terminal 30 and to each of the three conducting spots.

In the inductance element of Fig. 21, current passes directly from the illustrated terminal 30 to the link 148 to the conducting spot 147 whereby the outer three loops of the inductance element are short-circuited. If it is found by test that greater inductance is required, the legs of the link 148 may be successively severed to increase the inductance. It will be understood that the conducting spots 145, 146 and 147 are of the same nature as the terminal 30 whereby the link 148, which is a conducting plastic material, may make contact through the protective coating of silicon monoxide or magnesium fluoride with the conducting spots and/or with the conducting film overlying these conducting spots as explained in detail above. Where the conducting plastic material forming the link 148 crosses over one or more loops of the inductance element to reach an interiorly located conducting spot no contact is made with the conducting film since the conducting film is laid on a smooth glass surface whereby the protective coating forms an effective layer of insulation. However, depending on the thickness of the protective film and the voltage differential it may be necessary to employ an additional layer of insulation here, as in the case of the conducting strip 42 of Fig. 5.

In Fig. 22 the adjustment feature is shown applied to a capacitive element such as that illustrated in Fig. 4. In this instance the lowermost of the plate segments 33 is divided into portions 33a, 33b and 33c, each overlying a conducting spot 150 and connected by a link 152 to one terminal 30. Again, the conducting spots 150 may be of the same material as the terminals 30 and the link 152 is a conducting plastic material applied subsequent to the deposition by evaporation of the condenser element and the protective coating. As successive legs of the connecting link 152 are severed the capacity of the element is successively reduced. Preferably, the various segment portions 33a, 33b and 33c are of differing lengths whereby greater selectivity in the final value of capacity may be obtained.

In the embodiments of the invention illustrated in Figs. 21 and 22, it will be noted that adjustment is possible by movement of a suitable instrument along a straight line, as in the embodiments illustrated in Figs. 20, 20a and 20b.

Reference has previously been made to the use of tape to hold the individual glass sheets 21 and 22 in strip form during assembly of the various electrical components. It has been found that where a strip of paper 160, see Fig. 8, preferably a paper having high insulation characteristics such as paper formed of glass fibers, is inserted in between the two glass sheets, the two sheets may be more firmly bonded together. This is true, for example, where a thermosetting resin is employed as the bonding agent. It has been found, furthermore, that this arrangement or construction is particularly desirable in that it resists penetration by moisture. The arrangement of an insulating tape between the sheets 21 and 22 is, in itself, an important feature of the invention.

Where this construction is employed the strip of paper may be secured to the surface of the glass sheets 21 on which the electrical element has been deposited and may be used to retain a series of glass sheets 21 in strip form. In this case the opposite surface of the plate 23 should be scored in order to permit breaking of the strips into individual glass sheets 21 which are then retained in strip form by the tape. This tape then serves a dual purpose. That is, it serves to improve the bonding between the glass sheets 21 and the glass sheets 22, and at the same time serves to hold a series of glass sheets 21 in strip form. The tape is preferably of such width that a portion of each terminal 30 is exposed, whereby electrical contact may be established between the terminals and the respective leads 47.

Where an insulating tape is arranged between the sheets 21 and 22, and is also employed to hold a series of sheets 21 or 22 in strip form, the tape will remain intact after assembly of the components. The individual components may then be torn apart or may be left in strip form until ready for use.

A number of different types of electrical components have been illustrated and described herein. It is to be understood that the invention is not limited to these particular types of electrical components. Several methods have been disclosed for forming various electrical components by an evaporation process. It is to be understood that the invention is not limited to these methods and, in fact, is not limited to the basic evaporation process. For example, various portions of any given electrical element may be applied to the glass sheet 21 by rolling, painting, screening or other well known processes. On the other hand, various features of the evaporation methods disclosed are considered to be invention, particularly the apparatus and the steps of the methods which permit the deposition of a metallic film in a fine pattern.

Furthermore, as suggested above, the electrical element itself may be formed independently of the glass sheets 21 and 22 and merely inserted between these sheets in the final assembly.

It may now be seen that in an electrical component constructed in accordance with the invention the electrical element per se is substantially hermetically sealed. Also, the electrical element per se is protected by "hard" insulation, that is, it is protected by layers of glass rather than by a mere coating of insulating material. At the same time the electrical component is extremely simple in design, comprising little more than two sheets of glass with two leads and the desired electrical element per se sandwiched between the two glass sheets. This extremely simple construction produces an electrical component in which the electrical element per se is thoroughly protected. This same electrical component readily lends itself to production en masse and may inherently be extremely small whereby a very large number of electrical component parts may be produced en masse in the form of a larger sheet which is still sufficiently small that it may be handled readily. For this reason these electrical components may be made economically since each operation performed on the above referred to larger sheet of glass is performed on a very large number of individual electrical component parts.

Particular constructions and methods are also disclosed whereby electrical components of different types may be made durable, reliable, accurate and at the same time may be produced economically.

Reference has been made herein to glass sheets for the body of the components. Various other insulating or insulated materials may, of course, be used.

While particular embodiments of the invention have been shown, it will be understood, of course, that the invention is not limited thereto since many modifications may be made, and it is, therefore, contemplated to cover by the appended claim any such modifications as fall within the true spirit and scope of the invention.

The invention having thus been described, what is claimed and desired to be secured by Letters Patent is:

The method of producing an electrical component which comprises evaporating a metallic film in a circuitous pattern onto a sheet-like insulating base in a nonoxydizing environment through a mask arranged in front of said base, evaporating an insulating film over said metallic film, arranging said base in face-to-face relationship with another sheet-like insulating member, providing a pair of lead-receiving grooves in the abutting faces of said sheet-like members, arranging the ends of leads in said grooves, electrically connecting said leads to spaced points on said metallic film, and securing the entire assembly together as a single unit.

References Cited in the file of this patent

UNITED STATES PATENTS

| | | |
|---|---|---|
| 2,100,045 | Alexander | Nov. 23, 1937 |
| 2,564,498 | Nisbet | Aug. 14, 1951 |
| 2,621,276 | Howland | Dec. 9, 1952 |
| 2,688,679 | Schleuning | Sept. 7, 1954 |
| 2,692,190 | Pritikin | Oct. 19, 1954 |

FOREIGN PATENTS

| | | |
|---|---|---|
| 517,586 | France | Dec. 20, 1920 |
| 342,300 | Great Britain | Jan. 28, 1931 |

OTHER REFERENCES

Printed Circuit Techniques, National Bureau of Standards Circular 468, page 26.